(12) United States Patent
Sasse et al.

(10) Patent No.: US 6,450,306 B2
(45) Date of Patent: Sep. 17, 2002

(54) DASHPOT WITH TWO CYLINDERS

(75) Inventors: Thomas Sasse, Ennepetal (DE); Jörg Rehse, Gevelsberg (DE); Ulrich Hartig, Hermeskeil (DE); Oliver Poth, Holzerath (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/751,003

(22) Filed: Dec. 28, 2000

(30) Foreign Application Priority Data

Jan. 5, 2000 (DE) .......................................... 100 00 179

(51) Int. Cl.⁷ .................................................. F16F 9/10
(52) U.S. Cl. .................................. 188/322.19; 188/315
(58) Field of Search .............................. 188/310, 305, 188/313, 315, 322.14, 322.15, 322.19, 300

(56) References Cited

U.S. PATENT DOCUMENTS

| | | | | |
|---|---|---|---|---|
| 3,674,120 A | * | 7/1972 | Johnson ...................... 188/277 |
| 3,816,701 A | * | 6/1974 | Stormer ...................... 219/152 |
| 3,889,787 A | * | 6/1975 | Zehring et al. ............. 188/317 |
| 4,113,072 A | * | 9/1978 | Palmer ........................ 188/282 |
| 4,441,593 A | * | 4/1984 | Axthammer ........... 188/322.11 |
| 4,560,042 A | * | 12/1985 | Sell et al. .............. 188/322.21 |
| 4,614,255 A | * | 9/1986 | Morita et al. ............... 188/315 |
| 4,633,983 A | * | 1/1987 | Horvath et al. ......... 188/322.14 |
| 4,815,576 A | * | 3/1989 | Tanaka ........................ 188/315 |
| 5,070,971 A | * | 12/1991 | Dourson et al. ............ 188/317 |
| 5,115,892 A | * | 5/1992 | Yamaoka et al. ............ 188/282 |
| 5,577,579 A | * | 11/1996 | Derr ............................ 188/315 |

FOREIGN PATENT DOCUMENTS

| | | | |
|---|---|---|---|
| DE | 4213517 A1 | * | 11/1993 |
| JP | 403272337 A | * | 12/1991 |

* cited by examiner

Primary Examiner—Jack Lavinder
Assistant Examiner—Xuan Lan Nguyen
(74) Attorney, Agent, or Firm—M. Fogiel

(57) ABSTRACT

A dashpot with an inner cylinder (3) accommodated in an outer cylinder (1), and a piston (6) traveling back and forth inside on the end of a piston rod (5) and separating the inner cylinder into two chambers (7 & 8). The piston rod enters the cylinders through a hole at one end that seals it off and positions it. The outer cylinder is provided with a base (4) at the end opposite the end with the hole. The inner cylinder is centered along the axis of the outer cylinder at each end. The cylindrical gap (2) between the two cylinders is provided with a fluid-accommodating compartment (11) and, toward the base, a port (13) opening into the adjacent chamber (8). The chamber accommodates, preferably above the port, a vent (12). The mutually contacting ends of the cylinders are hot or cold welded together at the base end or at the end remote from the base.

12 Claims, 4 Drawing Sheets

DASHPOT WITH TWO CYLINDERS

BACKGROUND OF THE INVENTION

The present invention concerns a dashpot with two cylinders.

Two-cylinder dashpots of this genus are preferred for eliminating the vibrations that occur between a vehicle and its wheels. Such absorbers generally comprise two loosely concentric cylinders, the gap between them occupied by a cushion of gas that compresses to accommodate the gas forced in by a piston rod that slides in and out to various extents.

The base of the outer cylinder in a dashpot disclosed in German OS 1 750 679 is molded on. That of the outer cylinder disclosed in WO 97/16656 on the other hand is separate and welded, cemented, or soldered on.

Both embodiments have the drawback that precisely centering the inner cylinder in relation to the outer cylinder requires considerable care.

SUMMARY OF THE INVENTION

The object of the present invention is accordingly a simple and reliable means of attaching the outer cylinder to the inner cylinder of such a dashpot.

This object is attained in accordance with the present invention in a dashpot of the aforesaid genus by the characteristics recited in the body of claim 1. Advantageous additional and advanced embodiments are addressed by claims 2 through 5.

The major advantage of the present invention is that the outer cylinder is reliably secured to the inner cylinder. Furthermore, however, the means of attachment are simple, which considerably decreases the cost of manufacture.

BRIEF DESCRIPTION OF THE DRAWINGS

One embodiment of the present invention will now be specified with respect to the accompanying drawing, wherein.

DESCRIPTION OF THE PREFERRED EMBODIMENTS

Figure 1:
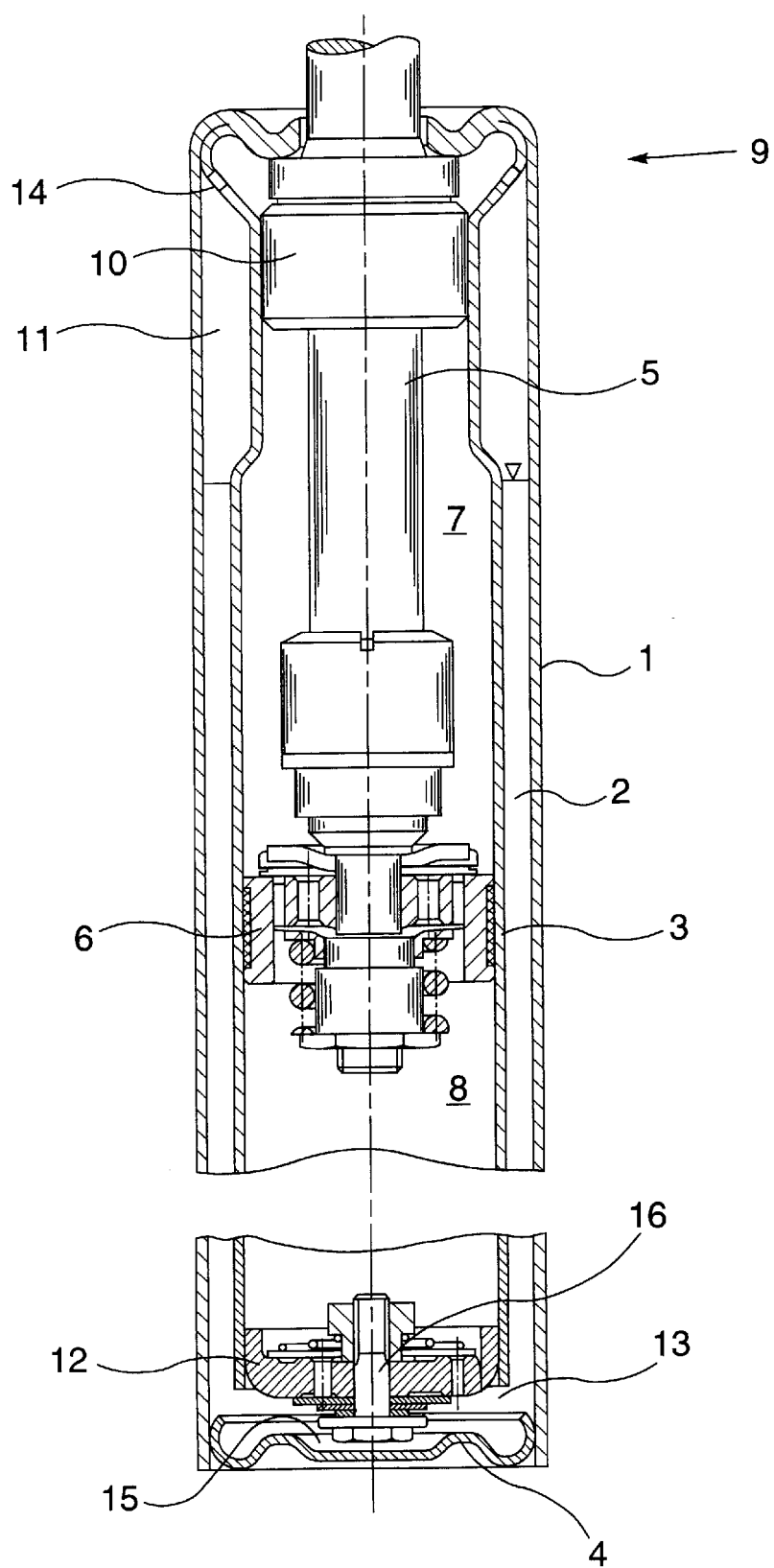
FIG. 1 is a section through a dashpot with two cylinders.

A dashpot comprises an inner cylinder 3 centered inside an outer cylinder 1 with a cylindrical gap 2 left between them. Outer cylinder 1 is provided with a base 4. A piston rod 5 travels into and out of the end of the dashpot opposite base 4 through a hole at the center sealed gas-tight by packing 10. Mounted on the lower end of piston rod 5 and accordingly traveling back and forth inside inner cylinder 3 is a piston 6, the spaces at each face constituting pressure chambers 7 and 8. A compressible-gas accommodating compartment 11 compensates for variations in the volume of gas forced in by piston rod 5 as it travels in and out. There is a vent 12 at the base 4 of inner cylinder 3. Below vent 12 is a port 13 that opens into cylindrical gap 2. Above packing 10 are other ports 14, which open into gas-accommodating compartment 11 and allow the removal of excess lubricant from piston rod 5.

The open ends 9 of the outer cylinder 1 and inner cylinder 3 in the embodiment illustrated in FIG. 1 are welded together and folded in, leaving a round hole at the center to align piston rod 5 above packing 10. Vent 12 is fastened to base 4 at the bottom of outer cylinder 1 by interlocking beads and grooves. The edge of base 4 is welded to the edge of outer cylinder 1. A depression 15 accommodates the head of a screw 16 employed to adjust vent 12.

Figure 2:
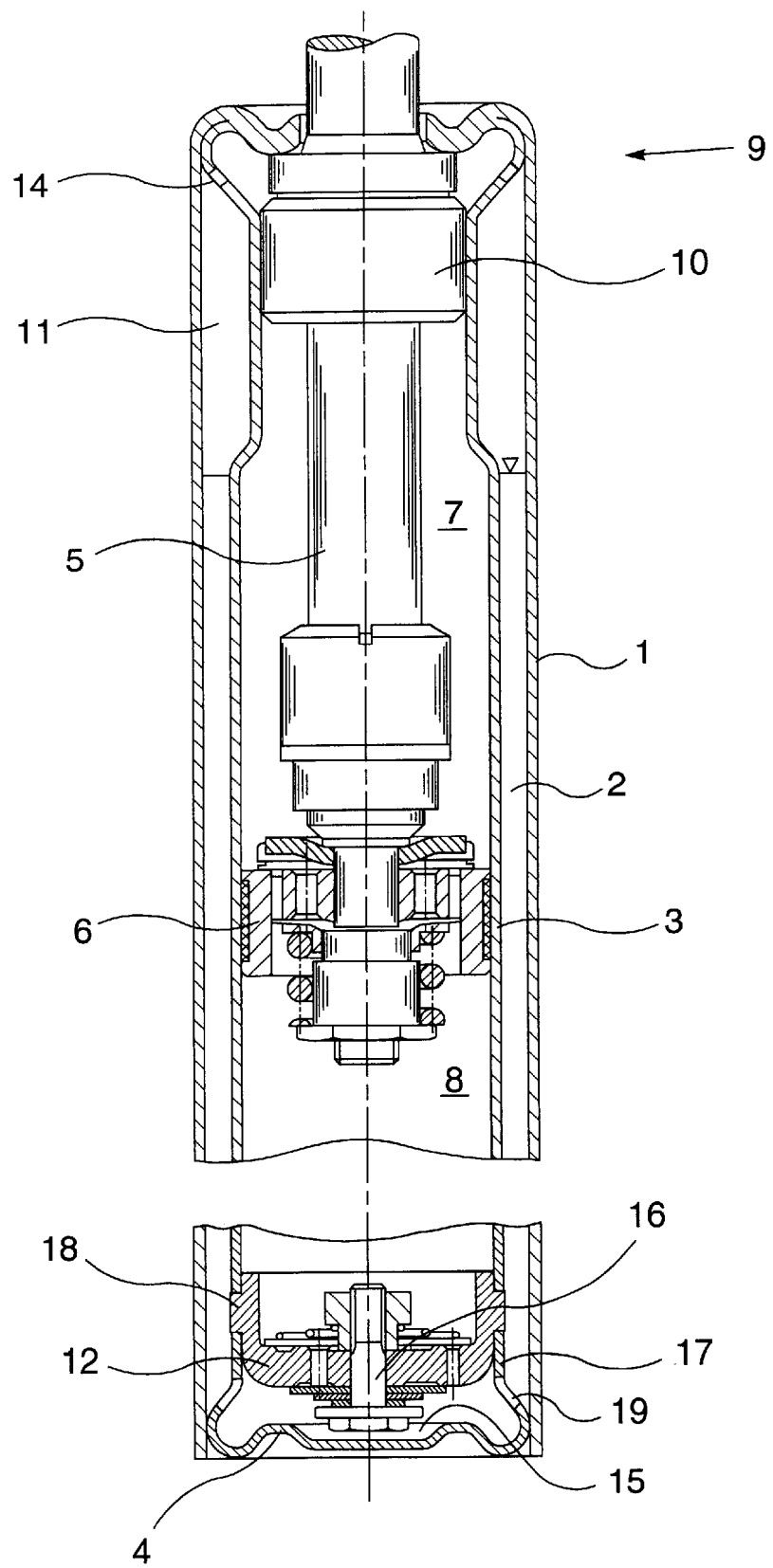
FIG. 2 illustrates another version of the dashpot.

FIG. 2 illustrates a variant of the embodiment illustrated in FIG. 1. The base 4 in this version is also welded to outer cylinder 1, but merges into an inward-tapering section 17 (or inward-extending depressions) with vent 12 mounted on its upper edge and provided with a collar 18. The section of inner cylinder 3 extending above the transition between base 4 and inward-tapering section 17 is provided with ports 19. There is a similar depression 15 in base 4 to accommodate the head of a vent-adjustment screw 16.

Figure 3:
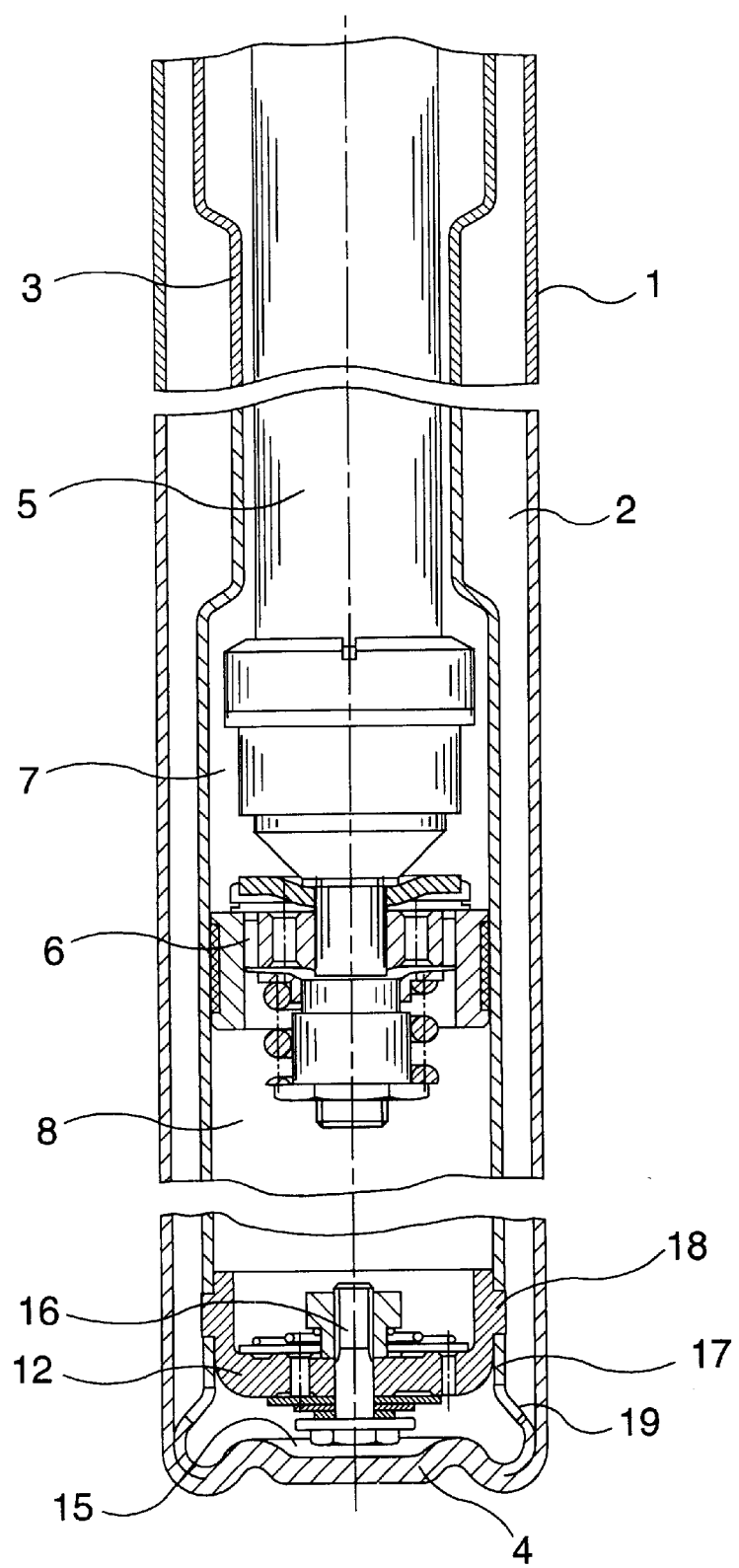
FIG. 3 is a larger-scale illustration of the base of a dashpot.

The upper end of the two-cylinder dashpot, which provides access to the piston rod, in the embodiment illustrated in FIG. 3 is conventional, and only the lower end is accordingly illustrated. The bottom edge of outer cylinder 1 rests against the edge of inward-tapering section 17 of inner cylinder 3, and both edges have been molded cold or hot around base 4 with no machining involved. Vent 12, which is fastened as in the embodiment illustrated in FIG. 2, can be introduced along with any other components through the upper, open, end of the dashpot. Once the dashpot has been, conventionally, closed and the cushioning and pressure-accommodating gases injected, the dashpot is finished. Here again, as in the embodiments illustrated in FIGS. 1 and 2, base 4 is provided with a depression 15.

Figure 4:
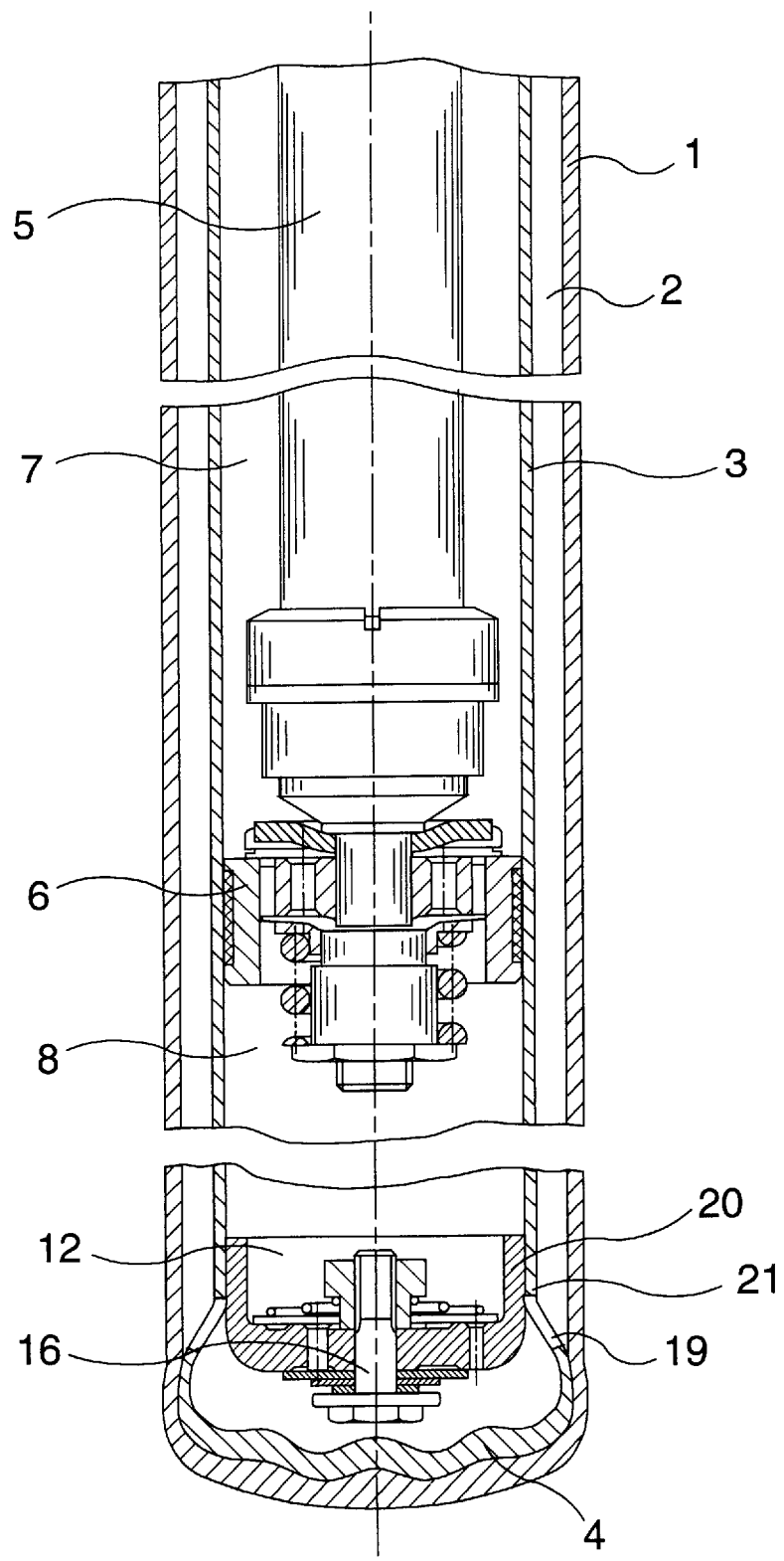
FIG. 4 illustrates another version of the base illustrated in FIG. 3.

The base 4 of the embodiment illustrated in FIG. 4 is similar to the base 4 specified with reference to FIG. 3, although inner cylinder 3 is in this case in a single part, and vent 12 must accordingly be inserted through it from above. To facilitate assembly, the lower end 20 of inner cylinder 3 tapers in slightly, preventing damage to the cylinder's inner surface from the entering vent. Ports 19 are here as well provided at the transition to lower end 20. A depression 21 demarcating the bottom edge of vent 12 is punched out along with ports 19.

What is claimed is:

1. A dashpot comprising an inner cylinder within an outer cylinder; a piston traveling back and forth inside said inner cylinder on an end of a piston rod and dividing the inner cylinder into two chambers; said piston rod entering the cylinders through an opening at one end, said opening sealing off and positioning said piston rod; a base at an end of said outer cylinder opposite said end with the opening; said inner cylinder being centered along an axis of the outer cylinder at each end; a cylindrical gap between the two cylinders; a fluid-accommodating compartment in a port opening into an adjacent one of said chambers, a vent above said port in said one chamber; mutually contacting ends of the cylinders being welded together at one of the ends, at least one end of said outer cylinder lying against an end of said inner cylinder, said end of said outer cylinder being welded to said end of said inner cylinder.

2. A dashpot as defined in claim 1, wherein the ends of the cylinders are welded to said base.

3. A dashpot as defined in claim 1, wherein the ends of the cylinders are molded into said base.

4. A dashpot as defined in claim 1, wherein said base has a short upward-and-inward tapering section of substantially the same diameter as the inner cylinder with said vent.

5. A dashpot as defined in claim 1, wherein said inner cylinder has inward-extending depressions above said port between said cylindrical gap and said one of said chambers to accommodate said vent.

6. A dashpot as defined in claim 1, wherein said contacting ends of the cylinders are hot welded together at one of the ends.

7. A dashpot as defined in claim 1, wherein said contacting ends of the cylinders are cold welded together at one of the ends.

8. A dashpot as defined in claim 3, wherein said cylinders are hot molded into said base.

9. A dashpot as defined in claim 4, wherein said cylinders are cold molded into said base.

10. A dashpot as defined in claim 1, wherein said contacting ends of the cylinders are welded together at the end adjacent said base.

11. A dashpot comprising an inner cylinder within an outer cylinder; a piston traveling back and forth inside said inner cylinder on an end of a piston rod and dividing the inner cylinder into two chambers; said piston rod entering the cylinders through an opening at one end, said opening sealing off and positioning said piston rod; a base at an end of said outer cylinder opposite said end with the opening; said inner cylinder being centered along an axis of the outer cylinder at each end; cylindrical gap between the two cylinders; a fluid-accommodating compartment in a port opening into an adjacent one of said chambers, a vent above said port in said one chamber; mutually contacting ends of the cylinders being welded together at one of the ends; said ends of the cylinders being welded to said base; said base having a short upward-and-inward tapering section substantially of the same diameter as the inner cylinder with said vent; said inner cylinder having inward-extending depressions above said port between said cylindrical gap and said one of said chambers to accommodate said vent, at least one end of said outer cylinder lying against an end of said inner cylinder, said end of said outer cylinder being welded to said end of said inner cylinder.

12. A dashpot comprising an inner cylinder within an outer cylinder; a piston traveling back and forth inside said inner cylinder on an end of a piston rod and dividing the inner cylinder into two chambers; said piston rod entering the cylinders through an opening at one end, said opening sealing off and positioning said piston rod; a base at an end of said outer cylinder opposite said end with the opening; said inner cylinder being centered along an axis of the outer cylinder at each end; a cylindrical gap between the two cylinders; a fluid-accommodating compartment in a port opening into an adjacent one of said chambers, a vent above said port in said one chamber; mutually contacting ends of the cylinders being welded together at one of the ends, said contacting ends of the cylinders being welded together at the end remote from said base.

* * * * *